US008332378B2

(12) United States Patent
Clayton et al.

(10) Patent No.: US 8,332,378 B2
(45) Date of Patent: Dec. 11, 2012

(54) FILE LISTENER SYSTEM AND METHOD

(75) Inventors: Robert Clayton, Atlanta, GA (US); Andrew Jamison, New York, NY (US); Prashant Hurria, New Delhi (IN); Jitin Gambhir, New Delhi (IN)

(73) Assignee: American Express Travel Related Services Company, Inc., New York, NY (US)

( * ) Notice: Subject to any disclaimer, the term of this patent is extended or adjusted under 35 U.S.C. 154(b) by 275 days.

(21) Appl. No.: 12/620,825

(22) Filed: Nov. 18, 2009

(65) Prior Publication Data

US 2011/0119274 A1 May 19, 2011

(51) Int. Cl.
*G06F 17/30* (2006.01)

(52) U.S. Cl. ........................................................ 707/706

(58) Field of Classification Search .................. 707/102, 707/200, 821, 706; 714/23, 799
See application file for complete search history.

(56) References Cited

U.S. PATENT DOCUMENTS

| | | | | |
|---|---|---|---|---|
| 5,920,847 | A | 7/1999 | Kolling et al. | |
| 5,987,429 | A | 11/1999 | Maritzen et al. | |
| 6,167,532 | A * | 12/2000 | Wisecup | 714/23 |
| 6,219,818 | B1 * | 4/2001 | Freivald et al. | 714/799 |
| 6,430,608 | B1 | 8/2002 | Shaio | |
| 6,496,850 | B1 | 12/2002 | Bowman-Amuah | |
| 6,601,192 | B1 | 7/2003 | Bowman-Amuah | |
| 6,609,128 | B1 | 8/2003 | Underwood | |
| 6,804,667 | B1 | 10/2004 | Martin | |
| 7,167,844 | B1 | 1/2007 | Leong et al. | |
| 7,487,137 | B2 * | 2/2009 | Singleton | 1/1 |
| 7,502,760 | B1 | 3/2009 | Gupta | |
| 7,596,571 | B2 | 9/2009 | Sifry | |
| 7,730,113 | B1 * | 6/2010 | Payette et al. | 707/821 |
| 8,145,930 | B2 * | 3/2012 | Kono et al. | 713/323 |
| 2002/0042796 | A1 | 4/2002 | Igakura | |
| 2002/0106065 | A1 | 8/2002 | Joyce et al. | |
| 2003/0050937 | A1 * | 3/2003 | Lusen et al. | 707/104.1 |
| 2003/0233334 | A1 | 12/2003 | Smith | |
| 2004/0098338 | A1 | 5/2004 | Uehara et al. | |
| 2004/0139032 | A1 | 7/2004 | Rowan | |
| 2004/0215610 | A1 | 10/2004 | Dixon et al. | |

(Continued)

FOREIGN PATENT DOCUMENTS

CA 2686098 5/2011

(Continued)

OTHER PUBLICATIONS

International Search Report and Written Opinion dated Jan. 7, 2011 in Application No. PCT/US2010/056124.

(Continued)

*Primary Examiner* — Etienne LeRoux
(74) *Attorney, Agent, or Firm* — Snell & Wilmer L.L.P.

(57) ABSTRACT

The system enables a data processing framework that polls for files using a listener, controls the workflow using event driven logic, processes financial transactions, and creates a business to business trading partner network. The listener ensures the reliability and data integrity of input files and performs archiving functions. The payment management functions automatically processes transactions, including payor (e.g., the buyer) initiated payments to a payee (e.g., a supplier) by utilizing a flexible, decoupled processing architecture. A payment management computer identifies a universal identifier for each entity and forms relationships and hierarchies in order to increase efficiency of the trading partner network. Metadata describes the format, validation and relationships for a wide variety of financial account data.

27 Claims, 4 Drawing Sheets

U.S. PATENT DOCUMENTS

| | | | | |
|---|---|---|---|---|
| 2005/0080726 | A1 | 4/2005 | Krajewski et al. | |
| 2005/0171811 | A1 | 8/2005 | Campbell et al. | |
| 2005/0240630 | A1 | 10/2005 | Cahill et al. | |
| 2005/0246193 | A1 | 11/2005 | Roever et al. | |
| 2006/0059560 | A1 * | 3/2006 | Montulli | 726/26 |
| 2006/0136309 | A1 | 6/2006 | Horn et al. | |
| 2006/0195816 | A1 | 8/2006 | Grandcolas et al. | |
| 2006/0248009 | A1 * | 11/2006 | Hicks et al. | 705/40 |
| 2007/0244920 | A1 * | 10/2007 | Palliyil et al. | 707/102 |
| 2007/0282739 | A1 | 12/2007 | Thomsen | |
| 2007/0282743 | A1 | 12/2007 | Lovelett et al. | |
| 2008/0091946 | A1 * | 4/2008 | Paulsen et al. | 713/170 |
| 2008/0162343 | A1 | 7/2008 | Bedier | |
| 2008/0208735 | A1 | 8/2008 | Balet et al. | |
| 2008/0235163 | A1 | 9/2008 | Balasubramanian et al. | |
| 2008/0300933 | A1 | 12/2008 | Britton et al. | |
| 2009/0144194 | A1 | 6/2009 | Dickelman | |
| 2009/0157518 | A1 | 6/2009 | Bishop et al. | |
| 2009/0276467 | A1 * | 11/2009 | Scholtes et al. | 707/200 |
| 2010/0211483 | A1 | 8/2010 | Zanzot et al. | |

FOREIGN PATENT DOCUMENTS

| | | |
|---|---|---|
| EP | 1450281 | 8/2004 |
| EP | 1471475 | 10/2004 |
| WO | 9704411 | 2/1997 |
| WO | 0011586 | 3/2000 |
| WO | 0108068 | 2/2001 |
| WO | 02065316 | 8/2002 |
| WO | 2007137283 | 11/2007 |

OTHER PUBLICATIONS

Website titled “Homepage / MasterCard Payment Gateway,” www.mastercardpaymentgateway.com/mpgpublic/welcome.do, retrieved on Nov. 17, 2009.

Website titled “Electronic Invoice and Payment for Business,” www.jpmorgan.com/cm, retrieved on Nov. 17, 2009.

Website titled “PayMode / Electronic Business to Business Payments / Bank of America Merrill Lynch,” www.corp.bankofamerica.com/public/public.portal, retrieved on Nov. 17, 2009.

Sepaton, Inc., “Comparing Deduplication Approaches: Technology Considerations for enterprise Environments”, http://www.busmanagement.com/article, 2008.

Combined Search and Examination Report under Sections 17 & 18(3), Mar. 5, 2010, UK Patent Application No. GB0920473.6.

Combined Search and Examination Report under Sections17 and 18(3), Mar. 25, 2010, UK Patent Application No. GB0920529.5.

Combined Search and Examination Report under Sections17 and 18(3), Mar. 25, 2010, UK Patent Application No. GB0920515.4.

Combined Search and Examination Report under Sections17 and 18(3), Mar. 25, 2010, UK Patent Application No. GB0920492.6.

International Search Report and the Written Opinion for International Application No. PCT/US10/56128 dated Jan. 7, 2011.

International Search Report and the Written Opinion for International Application No. PCT/US10/56129 dated Jan. 7, 2011.

International Search Report and the Written Opinion for International Application No. PCT/US10/56133 dated Jan. 10, 2011.

GB; Examination Report dated Jul. 22, 2011 in Application No. GB0920473.6.

GB; Examination Report dated Mar. 9, 2011 in Application No. GB0920473.6.

GB; Examination Report dated Mar. 3, 2011 in Application No. GB0920529.5.

GB; Examination Report dated Mar. 3, 2011 in Application No. GB0920515.4.

GB; Examination Report dated Mar. 3, 2011 in Application No. GB0920492.6.

PCT; International Preliminary Report on Patentability dated Jan. 25, 2012 in Application No. PCT/US2010/056124.

PCT; International Preliminary Report on Patentability dated Dec. 15, 2011 in Application No. PCT/US2010/056129.

USPTO; Office Action dated Nov. 14, 2011 in U.S. Appl. No. 12/620,849.

USPTO; Office Action dated Nov. 25, 2011 in U.S. Appl. No. 12/620,875.

USPTO; Office Action dated Nov. 18, 2011 in U.S. Appl. No. 12/620,906.

International Preliminary Report on Patentability dated Jul. 2, 2012 in Application No. PCT/US2010/056128.

Office Action received Jul. 9, 2012 in Canadian Application No. 2,686,296.

Advisory Action dated Jul. 27, 2012 in U.S. Appl. No. 12/620,875.

Office Action dated Apr. 10, 2012 in Canadian Application No. 2,686,096.

Office Action dated Jan. 20, 2012 in European Application No. 0920473.6.

Office Action dated Jan. 20, 2012 in European Application No. 0920529.5.

Office Action dated Jan. 20, 2012 in European Application No. 0920515.4.

Office Action dated Jan. 20, 2012 in European Application No. 0920482.6.

Office Action dated May 31, 2012 in Canadian Application No. 2,686,098.

Office Action dated May 31, 2012 in Canadian Application No. 2,686,297.

Final Office Action dated Apr. 27, 2012 in U.S. Appl. No. 12/620,849.

Advisory Action dated Jul. 3, 2012 in U.S. Appl. No. 12/620,849.

Final Office Action dated Jun. 1, 2012 in U.S. Appl. No. 12/620,875.

Office Action dated Nov. 25, 2011 in U.S. Appl. No. 12/620,875.

* cited by examiner

FILE LISTENER SYSTEM AND METHOD

FIELD OF INVENTION

The present invention generally relates to electronic commerce, and more particularly, to a business to business system for enabling buyer initiated payments.

BACKGROUND OF THE INVENTION

Various enterprises use bulk data processing to support their day-to-day business operations. These business operations typically include automation, complex processing of large volumes of information, application of complex business rules, validation and integration of information received, etc. Various payment management solutions try to meet dynamic business needs related to supporting different data formats and related to supporting disparate data sources. However, these solutions are typically limited because but the solutions are specific to business processes for which the solutions have been designed. Thus, these solutions are typically costly to implement and to maintain.

Thus, a long felt need exists for a data processing framework that supports the development, implementation and maintenance of robust, scalable, and extensible data processing applications that support complex business rules and widely varying data formats.

SUMMARY OF THE INVENTION

Business to business transaction account spending represents a largely untapped market for transaction account issuers and is a significant growth area for transaction account issuers in terms of top line revenue and profit. A transaction account issuer can also expect incremental charge volume from additional transaction account usage. Furthermore, the unique combinations of features discussed herein have been shown in research to attract new small business consumers to a transaction account company.

The unique data processing framework also creates efficiencies and lowers operational costs for a transaction account issuer by providing a simple, flexible and editable way for defining algorithms for different data processing solutions. The framework's adaptable approach to handling dynamic business needs and implementing complex business logic and processes can be easily integrated with existing enterprise solutions.

Buyers also benefit by cost savings associated by eliminating manual (e.g. "paper") processes. The payment management system's flexibility allows a buyer to, for example, manage their accounts payable, ensure timely payments to suppliers, avoid late penalties and preserve cash flow by taking advantage of the time lag between when the payment is provided to the supplier (e.g. by the issuer) and when the buyer is required to remit payment for the transaction account.

Suppliers can better manage days sales outstanding (DSO), as well as collection risk by encouraging consumers to initiate payments via the payment management system and pay for more purchases using a transaction account.

As such, the methods and systems provide a seamless, flexible, and efficient business data processing framework. The system provides a common platform for trading partners (e.g. buyers and suppliers) to interact with each other. The system allows buyers to manage a supplier enrollment campaign, the enrollment of the suppliers, and management of the payment process from initiation to receipt. Additionally, the system enables creation and maintenance of complex corporate account hierarchies and user provisioning. In one embodiment, the system includes a suite of Java® 2 Platform, Enterprise Edition (J2EE) batch processing utilities to perform the physical processing of payment files, authorization and settlement of payments, and payment confirmation tasks. In one embodiment, a file processing workflow binds system components (e.g., J2EE utilities) and drives file processing algorithms.

In one embodiment, a file is submitted to the data processing framework and the file is placed in a directory. For instance, a buyer who wishes to pay one of its suppliers submits a payment instruction file to a transaction account issuer. A file listener polls for the existence of new files in one of the transaction account issuer's file system directories and loads the file into memory. In order to determine whether the file is a duplicate (e.g., an exact copy file that has already been processed) the file listener executes a hashing algorithm using the file as input and calculates a file hash based upon file. The listener compares this file hash to the file hashes of previously processed files and decides if the file is a duplicate.

If the file is unique (e.g., no other file hashes match the file hash for this file), the listener examines the filename and other aspects of the file (e.g., the files size, a timestamp, etc.) and determines file attributes for the file and inserts the file in the database. The file listener may also set an event code for the file to indicate to other processes/procedures that the listener has completed its processing of the file.

In one embodiment, a payment management computer retrieves a file from a database based upon the file's event code (e.g., the event code may indicate that the file has been received and/or that an initial validation has been completed). The payment management computer (or a component of the computer) parses the payment instruction file into various data elements such as, for example, buyer data, supplier data, and a first transaction request. For example, the first transaction request may be a request from a buyer to send payment to a supplier (e.g., an entity that has sold the buyer a good or service).

In an embodiment, business rules are used by the payment management computer to validate the data. For example, validating the data may include ensuring that the values of particular data elements are within an expected range. Validating may also include extracting the data from its native format, translating it to a new format, and loading the newly formatted data into a new file or database. The payment management computer forms a payment request based upon the first transaction request and submits the first payment request to a payment authorization system. In one embodiment, forming the payment request occurs in response to an event code being set that indicates that other steps (e.g., extracting, translating and loading the data) have been completed.

The payment management computer may determine a universal indicator for each entity (e.g., buyer or seller) in a trading partner network. The universal indicator can be used to associate entities with each other. For instance, the universal indicator may be a service establishment number that is unique for all payees within a closed transaction processing network. The payment management computer is capable of identifying, for example, that two suppliers are actually part of the same corporate hierarchy. In one embodiment, the payment management computer may determine a corporate hierarchy for each universal indicator.

In an embodiment, the payment management computer creates a data schema that uses metadata to help manage and process supplier and financial account information that may vary in format, data type, validation rules, etc., depending on the location (country, region, etc) of the financial account. For example, the payment management computer may parse a supplier's financial payment data into a number of data elements and use metadata to validate and understand the data.

BRIEF DESCRIPTION OF THE DRAWINGS

A more complete understanding of the present inventions may be derived by referring to the detailed description and claims when considered in connection with the Figures, wherein like reference numbers refer to similar elements throughout the Figures, and:

DETAILED DESCRIPTION

Figure 1:
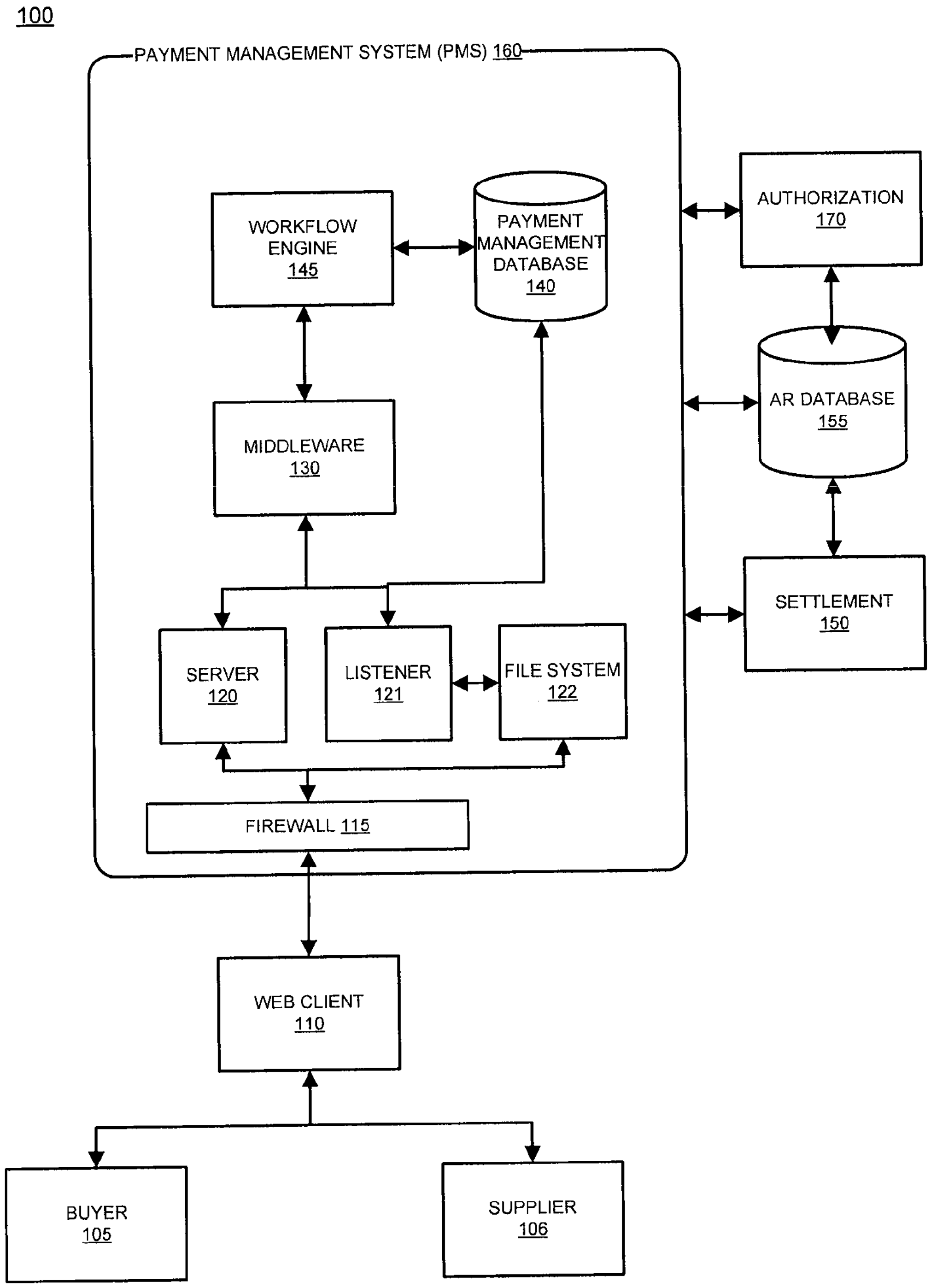
FIG. 1 is a block diagram illustrating major system components for enabling a business to business payment network, in accordance with an exemplary embodiment of the present invention.

The detailed description herein is presented for purposes of illustration only and not of limitation. For example, the steps recited in any of the method or process descriptions may be executed in any order and are not limited to the order presented. For the sake of brevity, conventional data networking, application development and other functional aspects of the systems (and components of the individual operating components of the systems) may not be described in detail herein. Any references to plural may include singular, and any references to singular may include plural.

The systems and methods include a unique combination of one or more features for receiving and processing files. In one embodiment, the files are received from a buyer and the files contain payment instructions. The system includes a listener that reliably detects when a new file has been submitted and a file processing infrastructure enabled by an event driven workflow engine processes the files according to the file's payment instructions.

"Entity" may include any individual, consumer, customer, group, business, organization, government entity, transaction account issuer or processor (e.g., credit, charge, etc), merchant, consortium of merchants, account holder, charitable organization, software, hardware, and/or any other type of entity.

An "account", "account number" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. The system may include or interface with any of the foregoing accounts or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

A "transaction account" may include any account that may be used to facilitate a financial transaction.

A "financial institution" or "transaction account issuer" includes any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

A "financial processor," "payment network," or "payment system" may include any entity which processes transactions, issues accounts, acquires financial information, settles accounts, conducts dispute resolution regarding accounts, and/or the like. As one of ordinary skill will recognize a transaction account issuer may operate as, and provide the functions and services of a financial processor.

A "merchant," "supplier" or "seller" may include any entity that receives payment or other consideration. For example, a supplier may request payment for goods sold to a buyer who holds an account with a transaction account issuer.

A "buyer" includes any entity that receives goods or services in exchange for consideration (e.g. financial payment). For example, a buyer may purchase, lease, rent, barter or otherwise obtain goods from a supplier and pay the supplier using a transaction account.

An "item" may include any good, service, information, experience or anything of value.

"Internal data" includes any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

With reference to FIG. 1, system 100 facilitates interaction between a buyer 105, a supplier 106 and a Payment Management System (PMS) 160 through a client 110 with a network connection. In one embodiment, Internet server 120 employs an authentication server to validate credentials, assign proper permissions, and retrieve preferences information for authorized users (e.g., buyer 105, seller 106, etc.) of PMS 160.

PMS 160 is a comprehensive framework designed to enable the development of robust, scalable, and extensible data processing applications. PMS 160 incorporates a data driven approach and can be easily integrated with existing enterprise solutions. Different data processing algorithms are performed based on different business need. PMS 160 may be platform independent, extensible and flexible and can support different data formats, data sources and can easily be adapted to support new business rules and workflow logic. In various embodiments, PMS 160 may include an inbound data validator, an outbound data generator and/or extract, load and translate functionality. Practitioners will appreciate that PMS 160 and system 100 may incorporate many commonly implemented transaction account charge authorization, account settlement and accounting processes which will not be discussed in detail herein.

In an embodiment, Internet server 120 employs an application server to manage various applications and utilities that are utilized by PMS 160. In various embodiments, Internet server 120 interacts directly with the various systems and components disclosed herein. In an embodiment, internet server 120 is a file server. System 100 may include any number of computing platforms and databases that may be commonly found within a typical transaction account or electronic commerce environment (e.g., at a payment processor, account issuer system, payment network, transactions database, etc.).

Such systems may include, for example, an authorization system 170, an accounts receivable (AR) database 155, and a settlement system 150. Other systems may include, for example, new accounts systems, management information systems, business information systems, third-party data providers and the like. Each of the systems may be interconnected by a network via any method and/or device described herein. A middleware server 130 (and/or middleware application) may serve as an intermediary between the various systems to ensure appropriate communications between disparate platforms.

PMS 160 or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more of the components of system 100 may be embodied as a customization of an existing system, an add-on product, upgraded software, a stand alone system (e.g., kiosk), a function of another System 100 component, a distributed system, a method, a data processing system, a device for data processing, a computer and/or a computer program product. Accordingly, individual system 100 components may take the form of an entirely software embodiment, an entirely hardware embodiment, or an embodiment combining aspects of both software and hardware. In one embodiment, a system 100 hardware component (e.g. a computer) may include a processor, a memory, a communications interface, a network interface, etc. Furthermore, individual system 100 components may take the form of a computer program product on a computer-readable storage medium having computer-readable program code means embodied in the storage medium. Any suitable computer-readable storage medium may be utilized, including hard disks, CD-ROM, flash memory, optical storage devices, magnetic storage devices, and/or the like. In one embodiment, a system 100 component and/or subsystem comprises a network interface communicating with a memory, the memory communicating with a processor; and the processor, when executing a computer program, configured to accomplish a variety of functions and/or steps.

The system contemplates uses in association with web services (including software as a service or "SaaS"), object access and messaging protocols, utility computing, pervasive and individualized computing, security and identity solutions, autonomic computing, commodity computing, mobility and wireless solutions, open source, biometrics, grid computing and/or mesh computing.

Buyer 105 may include any buyer that utilizes system 100. Buyer 105 may also include any buyer that has a transaction account with a transaction account issuer. For example, buyer 105 may also include anyone who applied for an account, currently has a transaction account in her possession, has proxy or other rights to use or maintain an account, is partially or fully responsible to pay the charges on the account and/or the like. Buyer 105 may include a buyer who uses an account code without any physical card, uses a transponder, and/or uses a physical transaction card, to pay for items purchased from a supplier (e.g., supplier 106). Buyer 105 may also utilize PMS 160 to initiate payments to a supplier. In an embodiment, buyer 105 may be, for example, an American Express® card member who purchases a variety of products from a number of suppliers and requests PMS 160 to coordinate, manage and execute payments to the suppliers. In one embodiment, buyer 105 may be an entity (e.g., a representative or agent of a buyer) that interacts with system 100 to coordinate payment transactions on behalf of a transaction account holder. In various embodiments, buyer 105 may interface with PMS 160 via any communication protocol, device or method discussed herein or known in the art. For example, buyer 105 may interact with PMS 160 by way of an Internet browser at client 110.

Client 110 comprises any hardware and/or software suitably configured to facilitate requesting, retrieving, send, receiving, updating, analyzing, entering and/or modifying data. For example, in one embodiment, client 110 is configured to facilitate input, receipt and/or review of information relating to merchants. Client 110 includes any device (e.g., personal computer) and/or software (e.g., browser applications) which communicates (in any manner discussed herein) with PMS 160 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that client 110 may or may not be in direct contact with PMS 160. For example, client 110 may access the services of PMS 160 through another server, which may have a direct or indirect connection to Internet server 120. In one embodiment, client 110 includes a network enabled file transfer interface (such as, for example, Tumbleweed SecureTransport™ file transfer solution).

As those skilled in the art will appreciate, client 110 includes an operating system (e.g., Windows NT, 95/98/2000, OS2, UNIX, Linux, Solaris, MacOS, etc.) as well as various conventional support software and drivers typically associated with computers. Client 110 may include any suitable personal computer, network computer, workstation, minicomputer, mainframe or the like. Client 110 can be in a home or business environment with access to a network. In an exemplary embodiment, access is through a network or the Internet through a commercially available web-browser software package.

Client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Client 110 may include any number of applications, code modules, cookies, and the like to facilitate interaction with PMS 160 in order to, for example, view status files, notices, statements, payment terms, elect a payment term, submit/authorize a payment, and the like. In one embodiment, client 110 may store buyer 105 and/or supplier 106 preferences and/or any other information disclosed herein on a hard drive or any other local memory device. Accordingly, client 110 may retrieve and store information within a memory structure of client 110 in the form of a browser cookie, for example. In another embodiment, client 110 retrieves information relating to buyer 105 and/or supplier 106 from PMS 160 on establishing a session with Internet server 120.

Firewall 115, as used herein, may comprise any hardware and/or software suitably configured to protect PMS 160 components from users of other networks. Firewall 115 may reside in varying configurations including stateful inspection, proxy based and packet filtering among others. Firewall 115 may be integrated as software within Internet server 120, any other PMS 160 components or may reside within another computing device or may take the form of a standalone hardware component.

Internet server 120 may include any hardware and/or software suitably configured to facilitate communications between client 110 and one or more PMS 160 components. Further, Internet server 120 may be configured to transmit data to client 110 within markup language documents. As used herein, "data" may include encompassing information such as commands, queries, files, data for storage, and/or the like in digital or any other form. Internet server 120 may operate as a single entity in a single geographic location or as separate computing components located together or in separate geographic locations. Internet server 120 may provide a suitable web site or other Internet-based graphical user interface which is accessible by consumers. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Listener 121 may be a component of PMS 160 that enables receipt and distribution of files across various components of system 100. In one embodiment, listener 121 includes a scheduler and a messaging service. Listener 121 may also be configured to invoke custom software logic in order to perform file processing. For example, the scheduler invokes business logic to perform validation checks on files prior to processing. Listener may directly or indirectly communicate with payment management database 140 to store and/or update file information, file attributes and copies of files (e.g. for archive purposes). In one embodiment, listener stores a copy of a payment instruction file in the file's original form by inserting the file into payment management database as a binary large object ("BLOB"). In one embodiment, listener 121 includes, or is capable of invoking, a hash algorithm such as the family of hash algorithms known as secure hashing algorithm (SHA) and SHA-2. In one embodiment, listener 121 may perform a hash on two files and compare the hashes to determine whether the two files are identical.

Middleware 130 may include any hardware and/or software suitably configured to facilitate communications and/or process transactions between disparate computing systems. Middleware components are commercially available and known in the art. Middleware 130 may be implemented through commercially available hardware and/or software, through custom hardware and/or software components, or through a combination thereof. Middleware 130 may reside in a variety of configurations and may exist as a standalone system or may be a software component residing on the Internet server 120. Middleware 130 may be configured to process transactions between the various components of PMS 160 and any number of internal or external issuer systems 100 for the purposes disclosed herein. In one embodiment, middleware 130 may process files and data by performing extract, load and transform operations ("ETL" operations).

In order to control access to any component of PMS 160, Internet server 120 may invoke an authentication server (not shown) in response to buyer 105 and/or seller 106 submissions of authentication credentials received at Internet server 120 from client 110. The authentication server may include any hardware and/or software suitably configured to receive authentication credentials, encrypt and decrypt credentials, authenticate credentials, and grant access rights according to privileges (e.g., pre-defined privileges) attached to the credentials. The authentication server may grant varying degrees of application and data level access to users based on information stored within a database and/or any other known memory structure.

Workflow engine 145 comprises a data processing framework. Workflow engine 145 may comprise one or more software applications, modules or data objects. The software may be any executable code written in any software programming language, such as, for example Java®. For example, workflow engine 145 reads data from payment management database 140 and instantiates a data object (e.g. a Java Bean®) to store the data for use by software modules or other objects. In one embodiment, workflow engine 145 comprises a plurality of procedures that poll payment management database for an event code and invoke software logic when a particular event code is present. In one event, the event code corresponds to a particular "state" of a payment file, a transaction and/or a supplier enrollment record.

Payment management database 140 and Accounts receivable ("AR") database 155 may include any hardware and/or software suitably configured to facilitate storing data relating to, for example, transactions, statements, amounts owed, payments, payment type election, identification, authentication credentials, consumer permissions, consumer preferences, and the like.

Payment management database 140 includes sophisticated data structures that store information for processing, managing and tracking data processed by the payment management system. In one embodiment, PMS 160 and, in particular, the workflow engine 145 component of PMS 160, are driven by the "state" of various processes and data objects. These states are represented in payment management database 140 as "event codes." Payment management database 140 includes data associating multiple objects and reflecting a variety of processing events and outcomes.

AR database 155 stores accounts receivable information and also stores payment information (e.g., method, amount, time, source of a payment) which is received from authorization system 170 and settlement system 150. In one embodiment, payment information may be divided or parsed into separate data (e.g. attributes). In one embodiment, AR database 155 may interact with a customer account database (not shown) that may store information such as consumer demographic data, consumer profile data, transaction account history, and other consumer account data. In an embodiment, AR database 140 may further interact with a billing system, an accounting system, a collections system, an account management system, a customer relationship management system, a credit bureau, a third-party, a service provider, a merchant, a merchant system, etc. to coordinate payments, communicate authorization and settlement information, report results, initiate transactions, etc.

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a “condition header”, “header”, “trailer”, or “status”, herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term “network” shall include any electronic communications means which orates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Totty, HTTP, The Definitive Guide (2002), the contents of which are hereby incorporated by reference.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

System 100 enables buyer 105 (e.g., small business consumer), to improve cash-flow management by utilizing a transaction instrument (or device), such as a transaction card to pay suppliers. PMS 160 provides a common platform for trading partners (e.g. buyers and suppliers) to interact with each other. The system allows buyers to manage a supplier enrollment campaign, the enrollment of the suppliers, and the buyer initiated payment process from initiation to receipt. Additionally, the system enables creation and maintenance of complex corporate account hierarchies. In one embodiment, the system includes a suite of Java® 2 Platform, Enterprise Edition (J2EE) batch processing utilities perform the physical processing of payment files, authorization and settlement of payments, and payment confirmation tasks. In one embodiment, a file processing workflow binds system components (e.g., J2EE utilities) and drives file processing algorithms.

Figure 2:
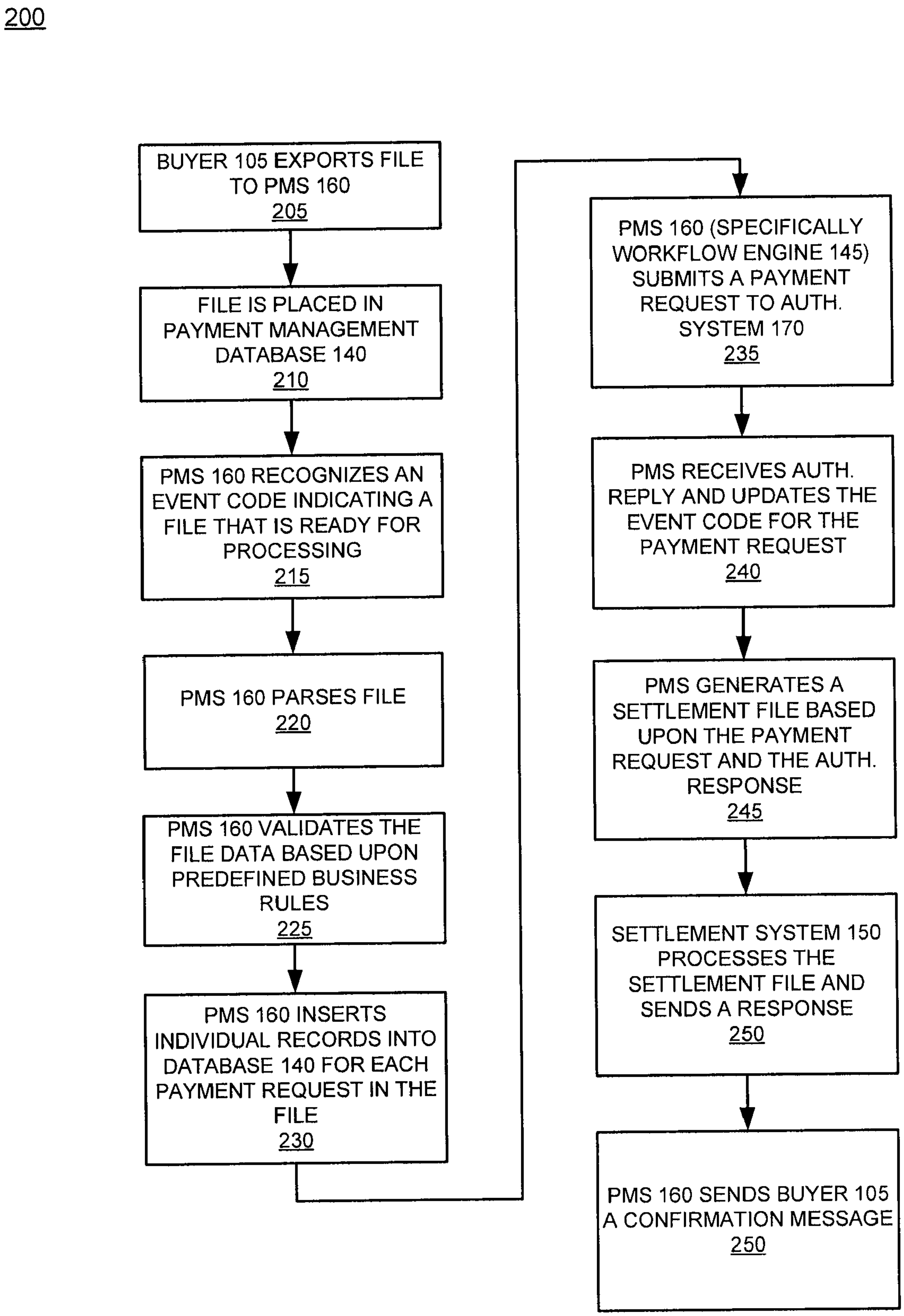
FIG. 2 is a flow chart illustrating an exemplary process for processing a payment instruction file, in accordance with an exemplary embodiment of the present invention.

With reference to FIG. 2, PMS 160 provides a flexible and reliable computing infrastructure for processing buyer initiated payments. In one embodiment, a buyer exports a file (e.g., a payment instruction file, a supplier enrollment file, etc.) from their AP or enterprise resource planning system ("ERP") system and sends the file to PMS 160 (step 205). The file is placed in payment management database 140 (step 210). The file is received in a source file directory at file system 122, and listener 121 polls for the existence of a new file and places it in the payment management database (See FIG. 3).

Figure 3:
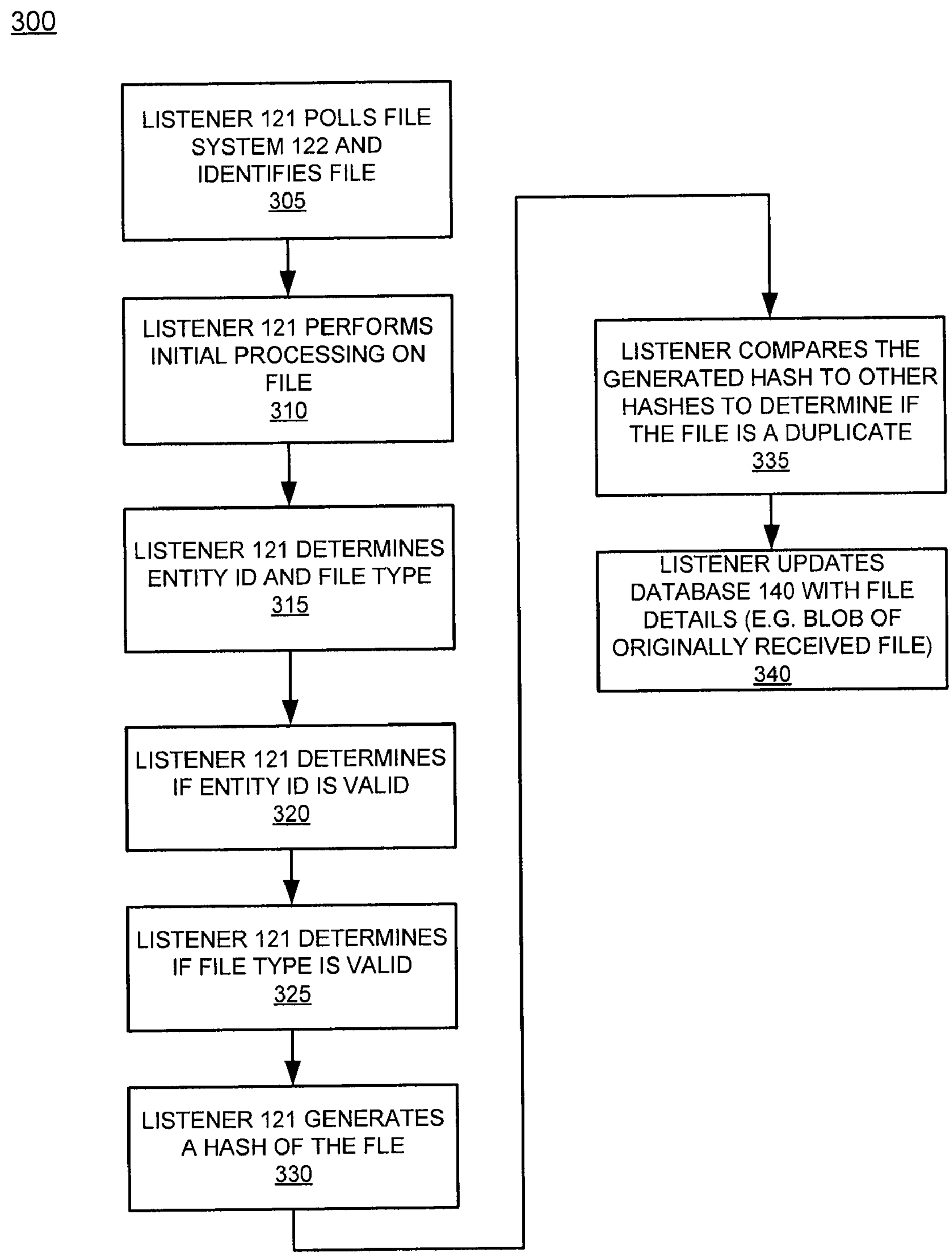
FIG. 3 is a flow chart illustrating an exemplary file listener process, in accordance with an exemplary embodiment of the present invention.

With reference to FIG. 3, in one embodiment, listener 121 polls the source directory on file system 122 (step 305) and performs initial processing (e.g., business rules and validation checks) on the file (step 310). In one embodiment, listener 121 is triggered by a scheduler which may be integrated within listener 121 or may be a separate component. Listener 121 reads configuration information from payment management database 140 and loads the configuration information into memory. In one embodiment, the configuration information is stored in a Java Bean (e.g., data object). The configuration information includes the location of a source folder in file system 122. Files system 122 may be a gateway between external applications and the PMS 160 related applications. The files are routed to a local directory (i.e., the source folder) on file system 122 where the files are read by PMS's 160 components (e.g., listener 121).

Listener 121 polls the source folder. Listener 121 includes sophisticated and comprehensive error handling features so that, for example, if the listener 121 is unable (e.g., folder does not exist, no access to folder, I/O error, etc) to poll the configured source folder, listener 121 logs the error in an alert log file. Files in the source folder may include payment instruction files, payment authorization files, payment authorization acknowledgement files and settlement files. Listener 121 reads a file from the source folder and uses the filename to determine an entity identifier (ID) and a file type (step 315). In one embodiment, the entity identifier is a unique identifier assigned to the entity (e.g., the buyer).

Listener 121 checks payment management database 140 to determine whether the entity ID exists on the database (e.g., to determine whether the entity that originated the file is recognized by PMS 160) (step 320). If the entity is not found, listener 121 updates the database with the file details and an event code. In one embodiment, the event code is an indication of a file's status or the files processing state. An event matrix may be stored on the database and may be used to determine the event code.

Listener 121 may also determine whether the entity is "active," i.e., whether the buyer has an active transaction account and/or is appropriately registered to submit files via PMS 160. Listener 121 also validates the file type (step 325). In one embodiment, only certain file types are valid for certain entities. For example, entity 1 (e.g. a buyer) may use a certain ERP system and listener 101 expects files of a certain type to be sent by entity 1. At any point during the process, if an error or an exception (e.g. unrecognizable file type) occurs, listener 121 consults the event matrix and updates the event code for the file being processed. Listener 121 determines whether the file contains any data, e.g., listener 101 checks to ensure that the file size is greater than zero.

Listener 121 generates a hash (i.e., a "hash code") for the file by using the file content as input for a secure hashing algorithm (e.g., SHA-2) (step 330). Listener 121 compares the generated hash code with all the active (e.g. not cancelled or failed) hash codes existing in the database for the same entity. In this way, the listener checks to determine whether the file is a duplicate; i.e., the file has already been received by PMS 160 from the entity (step 335). If the generated hash code is unique, listener 121 updates the payment management database 140 with the file's details or attributes (step 340). File attributes may include an original file size, a file create timestamp, a file sequence number, an original file snapshot, a file status, a hash code, a file type, and an entity identifier. In an embodiment, the original file snapshot is an exact copy of the original file stored in BLOB format on the payment management database 140 and serves as an archive for PMS 160.

In one embodiment, listener 121 may reprocess files with failed error codes and/or may execute one or more business rules to fix processing errors and/or data inconsistencies. Errors or exceptions that occur during listener 121 processing may be logged to an alert log file. In an embodiment, a file tracking audit table provides an audit trail of all listener 121 processing. For example, each time listener 121 updates an event code for the file, a corresponding update is performed to update the file tracking audit table with the file details, the files' previous status, and the files' new status, etc. As such, the audit table provides insight into each processing step, and its outcome, performed on the file.

PMS 160 processes payment instruction files (PIFs) that have been received via the listener. File processing is data driven and is enabled by the event codes (which indicate the current state of a file or transaction) in the payment management database and by workflow engine 145. In one embodiment, workflow engine 145 comprises a number of software modules that continuously poll the database for an event code. The event code indicates that a file is in a particular processing state. A software module is instantiated by workflow engine 145 to execute a process that is associated with the state that the file is currently in.

With reference again to FIG. 2, PMS 160 retrieves a file from the payment management database, fully or partially based upon the event code associated with the file (step 215). In one embodiment, the file is a PIF and contains a list of one or more payment requests and associated data intended to result in suppliers receiving payment from a buyer's transaction account. Workflow engine 145 executes code to parse the PIF into payment file data comprising a buyer, a supplier, and a number of payment transaction requests (step 220). PMS 160 validates the payment file data based upon predefined business rules (step 225). For instance, PMS 160 may determine that a supplier does not accept payment requests under a certain amount. PMS 160 updates the event code of the PIF and inserts individual records for each payment request in to payment management database 140 (step 230).

Workflow engine 145 recognizes a payment request record on the database with an event code that indicates the payment request is ready to be submitted to authorization system 170 (step 235). Authorization system 170 receives the request and processes it. Authorization system 170 may process payment authorization requests using any process know in the art for transaction account authorization. Authorization system 170 returns a response and PMS 160 updates the event code of the payment request (step 240). PMS 160 generates a settlement file for the payment request and sends it to settlement system 150 (step 245). Settlement system 150 processes the settlement file and returns a settlement response file to PMS 160 (step 250). In one embodiment, settlement system 150 causes a charge to be entered on the buyer's 105 transaction account (e.g., updates the buyer's account on AR database 155) and sends a payment to the supplier 106.

In response to receiving the settlement response file, PMS 160 generates a confirmation file and sends it to buyer 105 (step 255). If any of the authorization or settlement processing fails, the confirmation file may indicate that payment to supplier 106 has failed. In one embodiment, the confirmation file includes confirmation for multiple payment requests. For example, PMS 160 may be configured to generate a confirmation file containing the confirmation of payment (or confirmation of payment failure) corresponding to each payment request included in an originally submitted PIF. PMS 160 may also be configured to generate a confirmation file that batches confirmations for all buyers during a specified period of time (e.g., a day or a week's time).

In one embodiment, as discussed previously, PMS 160 includes a state driven data processing architecture. Workflow engine 145 and payment management database 140 work in concert to determine the current state of a file or payment request and instantiate a processing module (e.g., a procedure or other executable object or module) to perform processing (i.e., a "step" or series of steps) based upon the state and on other attributes stored on payment management database 140. Each processing step may result in updating the state of a file or payment request. For example, according to the outcome of a processing step, PMS 160 may update a record associated with the payment instruction file with an event code.

In an embodiment, a payment request file received by PMS 160 via listener 121 may contain multiple payment requests. During the extract, transform and load process, separate tracking records for each individual payment request are placed on payment management database 140. Thus, for example, a payment request file with ten payment requests results in eleven tracking records on payment management database 140—one record to track the state (or status) of the file itself and ten records to track each of the payment requests. In one embodiment, the state of the file may be determined as an aggregate of the combined states of the individual payment requests.

In an embodiment, PMS 160 includes a status reporting and presentation module ("SRPM") that presents the status of payment requests according to the state, or data processing step, the payment request is in. SRPM provides status messages that vary according to the audience. For example, buyer 105 and supplier 106 may receive different status messages for the same payment request (i.e., the same transaction) and a PMS 160 system administrator may see an entirely different status message. In one embodiment, SRPM includes a user interface that includes a dashboard. The dashboard provides a user friendly, intuitive interface for a user (e.g. buyer 105) to view the status of a multiple files and/or payment requests. In one embodiment, the user interface is configured differently depending on the type of user that is viewing the interface. In an embodiment, status messages are communicated via an email message, a text message, a website or a status file.

Figure 4:
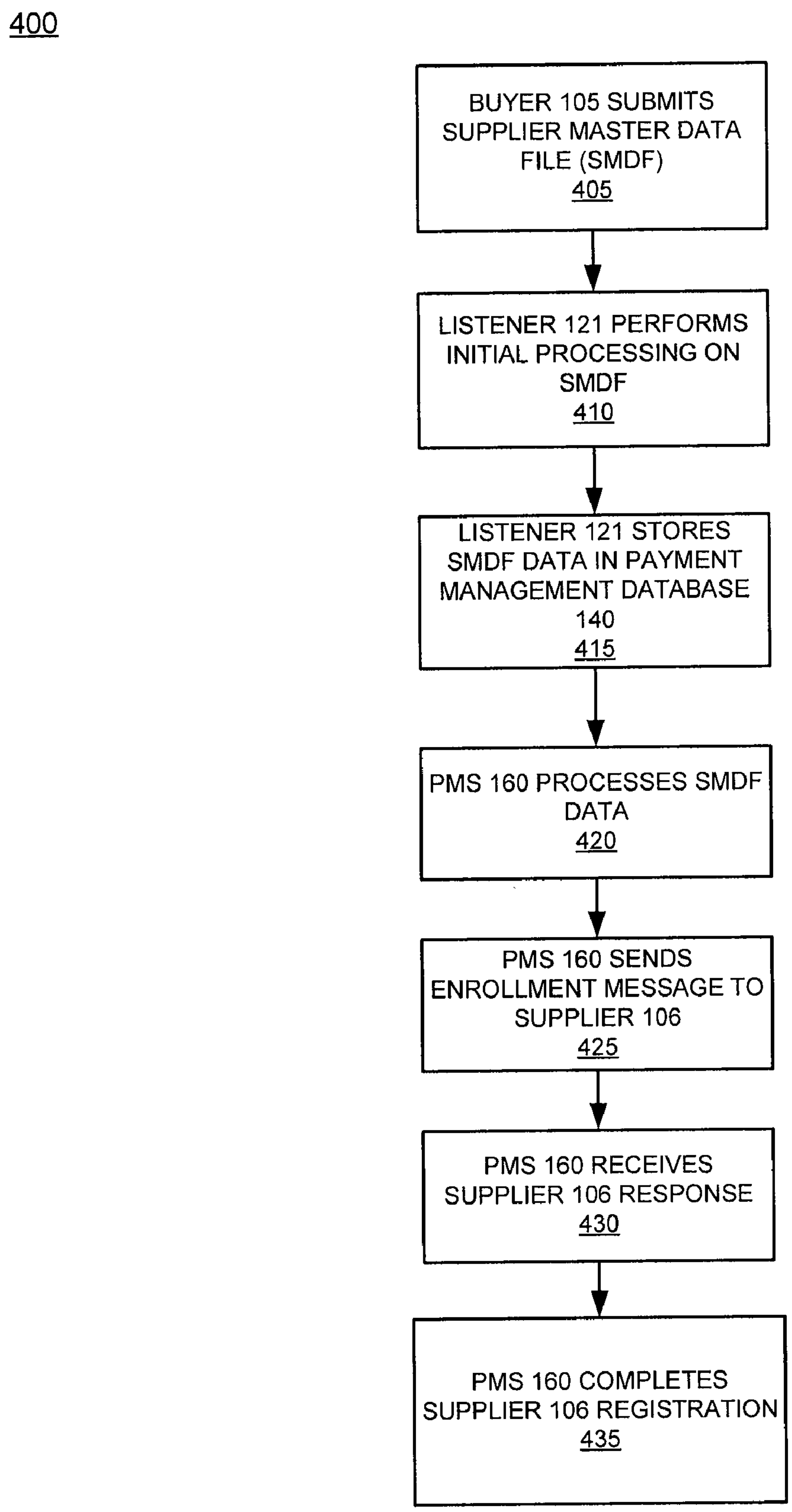
FIG. 4 is a flow chart illustrating an exemplary supplier enrollment process, in accordance with an exemplary embodiment of the present invention.

While some parties may already be enrolled in the system, the above procedure may be supplemented by an enrollment process at any point during the process. With reference to FIG. 4, in one embodiment, PMS 160 includes a process and interface to enable enrollment. A buyer 105 submits a supplier master data file ("SMDF") and the SMDF is routed to file system 122 (step 405). The SMDF includes information regarding suppliers that the buyer would like to pay using a transaction account and by submitting payment requests to PMS 160. The SMDF may include, for example, the name and address of the supplier, the supplier's transaction account number, a company or enterprise identifier, supplier specific business rules, etc. In one embodiment, a "service establishment number" is the enterprise identifier and allows the PMS 160 to construct a corporate hierarchy for a supplier.

Listener 121 polls file system's 122 source directory and identifies the SMDF and performs initial processing on the SMDF (step 410). Listener 121 stores the SMDF data in payment management database 140 (step 415). PMS 160 processes the SMDF data (step 420). PMS 160 may perform, validate, augment and/or transform the suppler data. PMS 160 creates an enrollment message for supplier (e.g., supplier 106) identified in the SMDF (step 420). Supplier 106 responds to the enrollment message. In one embodiment, supplier 106 may communicate with PMS 160 in the same manner as buyer 105 (e.g., by placing a file in file system 122). PMS 160 reads supplier's 106 response (step 425) and completes the supplier registration in PMS 160 (step 430). In one embodiment, supplier 106 is already registered to receive buyer initiated payments via PMS 160 and, in this case, PMS 106 may send a modified or "partial" enrollment request to supplier 106.

The data submitted by a buyer in the SMDF may identify the supplier in a wide variety of ways. For instance, the SMDF may include the supplier's name (e.g., company name), address, contact name (i.e., the name of an employee such as the head of the accounts receivable department), phone number, email address, etc. The supplier's response to the enrollment invitation sent by the payment management system may provide additional information such as, for example, the supplier's bank account, preferred method or time for receiving payment, information on how to interpret the supplier's invoices, etc. Thus, the payment management system is able, as described in detail herein, to receive from a buyer a payment request for a supplier and identify the correct account to send payment. However, in order to increase the efficiency and effectiveness of a payment management system a true business to business trading network should be constructed.

A challenge of building many-to-many business-to-business trading partner networks is the lack of common data elements and standards across the trading partners. For instance, a buyer's AP and/or ERP systems are typically the source of suppliers' profile data and there are often massive discrepancies between the supplier profile data elements stored for the same supplier by different buyers. For example, company names, addresses, telephone numbers, contact names, and similar data elements exhibit a high degree of variability across the profile data stored by different buyers. Certain key fields such as federal or state tax identifiers ("tax ID") provide for a higher degree of confidence that two suppliers are in fact members of the same company, however the tax ID is infrequently known by the personnel enrolling on behalf of the buyer or the enrolling supplier.

Thus, in order to eliminate duplicate supplier information and to construct a corporate hierarchy interrelating departments, locations, and subsidiaries of the same supplier, PMS 160 identifies a universal identifier (UID) for a supplier. In one embodiment, PMS 160 takes advantage of internal data or closed-loop transaction system data where a UID is assigned to each entity (e.g., supplier) that accepts payments using a transaction account. "Internal data" includes any data a credit issuer possesses or acquires pertaining to a particular consumer. Internal data may be gathered before, during, or after a relationship between the credit issuer and the transaction account holder (e.g., consumer or buyer). Internal data may further comprise closed-loop data and open-loop data. Closed-loop data includes data obtained from a credit issuer's closed-loop transaction system. A closed-loop transaction system includes transaction systems under the control of one party. Closed-loop transaction systems may be used to obtain consumer transactional data. In one embodiment, the universal identifier is called the "service establishment number."

PMS 160 uses the UID to programmatically recognize that two different "enrolling users" are actually members of the same corporate organization or enterprise (e.g., company). Enrolling users may be a buyer 105 or a supplier 106. In one embodiment, PMS 160 does not generally differentiate a buyer from a supplier, outside of the specific context of a transaction. In other words, a buyer in one transaction may be a supplier in the context of a different transaction. PMS 160 constructs a corporate hierarchy which allows the enrolled users to be linked to a common hierarchy (e.g., a corporate or account hierarchy). The corporate hierarchy is stored in payment management database 140 and enables PMS 160 to segment access to data into different access levels dictated by the hierarchy. Thus, for example, a user at corporate headquarters (such as a financial controller) may view payment data for multiple locations, while a user at any given location may only be capable of viewing data for that particular location.

In one embodiment, payment management database 140 includes data structures that allow for a single, generic representation of a wide variety of financial accounts. Metadata structures describe, for example, a number of account components that comprise a financial account, as well as the data characteristics (such as data type, size, format, and validation algorithms) of these account components. Furthermore, using an abstracted one-to-many relationship between the conceptual financial account and the account components that comprise the financial account, payment management database 140 stores financial accounts of any type, for any financial institution in any country without changes to the underlying data model.

Set forth below is an exemplary embodiment of a financial account, the account components from which the financial account is constructed, and the financial account metadata structures. A credit issuer may issue a "Card Account" to a card holder. This Card Account is comprised of the following attributes: Card Number, Expiration, Date, Embossed, Name, Card Identifier (CID). Based upon the type of financial account (in this case Purchasing Card), and Financial Institution (in this case American Express), the metadata describing this account structure would be as follows:

| Account Component ID | Account Component Name | Data Type | Size | Required? | Validation Algorithm |
|---|---|---|---|---|---|
| 1 | Card Number | Number | 15 | Yes | Mod10( ) |
| 2 | Expiration Date | Date | 5 | Yes | ValidateDate( ) |
| 3 | Embossed Name | AlphaNumeric | 40 | No | ValidateAlphaNum |
| 4 | CID | Number | 4 | No | ValidateCIDWithCrypto( ) |

Thus, in this example, data stored for a card account may be stored as:

| Entity ID | Country/Region | Form Of Payment | Financial Institution | Account Component ID | Account Component Value |
|---|---|---|---|---|---|
| Buyer1 | USA | CPC | American Express | 1 | 123456789012345 |
| Buyer1 | USA | CPC | American Express | 2 | 07/11 |
| Buyer1 | USA | CPC | American Express | 3 | BUYER CORP |
| Buyer1 | USA | CPC | American Express | 4 | [NULL] |

Globally, the number of account components comprising a financial account, as well as their data type, size, format, and validation rules are highly variable from country to country, as well as within a given country or financial region based upon account type and potentially financial institution type. It is challenging for application teams and data modelers to devise storage mechanisms that have the level of genericism required to support the various possible financial account structures, while at the same time providing the necessary data integrity validations to ensure that the account components captured and stored are of the proper data type, size, format, and meet other validation rules (e.g., Modulus calculations).

In one embodiment PMS 160 receives a financial account attribute set for each of a plurality of financial account types. The financial account attribute sets define the type and format of data that is included for each financial account type. For instance, the financial account attribute set may include an account identifier format that specifies the size, data type, sub-fields and validation rules (e.g., a validation algorithm) for an account identifier format used in a particular country or region.

PMS 160 analyzes the financial account attribute set for each of the financial account types to determine metadata that describes the account attributes. A financial account data table for storing each account identifier format is defined based upon the financial account attributes or the metadata that describes it. PMS 160 defines and stores the metadata that is used to support various parsing, validation and processing functions. In various embodiments, PMS 160 defines metadata for: describing each account identifier format; algorithms for validating account identifier data; describing each set of financial attributes; describing country specific attributes (e.g., the account identifier format used in Canada); region specific attributes; regulatory specific attributes (e.g., reporting requirements for large payments made to a foreign based companies); payment methods, processes and/or restrictions for the various financial account types; and/or how a financial institution receives payment for a financial transaction settlement.

PMS 160 also includes business rules for rewarding positive behavior of a transaction account owner (e.g., a consumer or buyer 105). In one embodiment, PMS 160 enables systematic and automatic discount, loyalty points or awards to consumers when they use their transaction account for payment, or when they use the transaction account to pay a certain supplier or to pay for a certain product. As a reward for exhibiting a positive behavior such as paying a bill early or paying off the outstanding balance on a transaction account, a discount is systematically initiated simply by the consumer's use of the transaction account to pay a supplier. In other words, as part of an award for exhibiting a positive behavior, consumers receive consistent discounts off of the full (gross) amount of the transaction from each supplier. Such discounts may be reflected on the consumer's monthly statement, and may also accumulate and aggregate discounts or information related to the discounts. In addition, suppliers may also receive statements detailing how and for what goods and/or services discounts were given to consumers. This feature is advantageous to the issuer because it provides the ability to incentivize the consumer to exhibit a desired positive behavior by offering (and/or rewarding) better embedded card benefits. One benefit to merchants of this feature is the ability to drive additional business (e.g., incremental volume and new consumer acquisition), build brand equity through an innovative marketing program, and participate in an innovative marketing program at little or no additional technology expense. Consumers benefit from the automated discounting features it provides the ability to gain meaningful benefit and savings from merchant partners by simple use of the account, the ability to see immediate and tangible savings on monthly statement, guaranteed combinability of savings, and discounting on full amount of transaction (including any taxes or surcharges). Consumers also are able to see credits on their statement and receive accumulated, detailed and aggregate savings information. Additional details of such automatic discounting and consumer savings features are disclosed in U.S. application Ser. No. 11/161,906, entitled "Card Member Discount System And Method" and filed on Aug. 22, 2005, which is hereby incorporated by reference in its entirety.

In an embodiment, PMS 160 enables buyer 105's use of a limited use identifier account to pay a supplier 106. In one embodiment, a limited use identifier (LUI) is a transaction account identifier. Moreover, pursuant to some embodiments, LUIs may be associated with a "pre-authorization record" (or, put another way, account identifiers may be "pre-authorized"). The term "pre-authorized" or "pre-authorization record" includes data associated with an account identifier which specifies the conditions in which a transaction associated with the account will be authorized. Such a condition may be referred to as "use restriction."

In an embodiment, an LUI includes individual accounts that are associated with a particular master account. In one embodiment, a plurality (or a "pool") of these LUI's may be associated with a master account and the LUI's are used by the purchasing entity to purchase goods or services. In an embodiment, a transaction facilitator acts as the intermediary between a consumer associated with the limited use identifier and the merchant. For example, the intermediary may allocate LUI's of a LUI pool, implement or modify use restrictions associated with the LUI's etc. Furthermore, limited use identifiers may involve a partial shipment and/or limited use identifiers that may involve refreshing the preauthorization information. For more information regarding limited use identifiers, partial shipments, and refreshable limited use identifiers please see U.S. patent application Ser. No. 12/355,576, filed on Jan. 16, 2009 and entitled "Authorization Refresh System And Method"; U.S. application Ser. No. 10/724,940, entitled "Method And System For Completing Transactions Involving Partial Shipments" and filed on Dec. 1, 2003; U.S. application Ser. No. 10/391,689, entitled "Method And Apparatus For Facilitating A Transaction" and filed on Mar. 19, 2003.

In an embodiment, PMS 160 determines that a refresh of an LUI should occur based upon a pre-authorization record, a payment request, or a business rule. In response to determining that a refresh should occur, PMS 160 refreshes the authorization criteria by creating a second pre-authorization record (e.g., a second pre-authorization record with a higher pre-approved transaction limit). In an embodiment, PMS 160 determines, based on transaction information, that the transaction is associated with a partial shipment of goods from the supplier to the buyer. PMS 160 calculates a new pre-authorized amount for the LUI based at least partially upon a predetermined rule comprising reducing a previous pre-authorized amount by at least a portion of the transaction amount.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and/or C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A computer-implemented method comprising:

polling, by a computer-based system capable of processing files, a source directory at periodic intervals for new files;

determining, by the computer-based system, that a first file is a new file;

calculating, by the computer-based system, a first file hash based upon the first file;

retrieving, by the computer-based system, a second file hash associated with a second file from a database, wherein a second file entity identifier from the second file and a first file entity identifier from the first file are associated with a same entity;

determining, by the computer-based system, that the first file is an expected file type for the same entity;

determining, by the computer-based system, the first file is unique in response to the first file hash being unequal to the second file hash;

examining, by the computer-based system, the first file to determine first file attributes;

inserting, by the computer-based system, the first file attributes into the database; and parsing, by the computer-based system, the first file into payment file data.

2. The method of claim 1, further comprising:

reading, by the computer-based system, the first file from a destination folder;

determining, by the computer-based system and based upon a first filename of the first file, the file type and the first file entity identifier;

determining, by the computer-based system and in response to retrieving the first file entity identifier from the database, that the first file entity identifier exists; and in response to determining that the first file entity identifier exists, validating that a first entity is active and that the first file type is a valid file type for the first entity, wherein the first entity is associated with the first entity identifier.

3. The method of claim 1, further comprising determining, by the computer-based system and based upon a first filename of the first file, a first file type and a first file entity identifier.

4. The method of claim 1, further comprising determining, by the computer-based system and in response to retrieving the first file entity identifier from the database, that the first file entity identifier exists; and in response to determining that the first file entity identifier exists, validating that a first entity is active and that the first file type is a valid file type for the first entity, wherein the first entity is associated with the first entity identifier.

5. The method of claim 1, further comprising deleting, by the computer-based system, the first file from the destination folder.

6. The method of claim 2, wherein the first filename comprises at least one of a first file owner, the file type and other data.

7. The method of claim 1, wherein the first file entity identifier corresponds to a buyer.

8. The method of claim 1, wherein the first file is a buyer initiated payment file.

9. The method of claim 1, wherein first file is an authorization file.

10. The method of claim 1, wherein the payment file data comprises a buyer, a seller, and a payment transaction request.

11. The method of claim 1, wherein the first file attributes comprise an original file snapshot, wherein the original file snapshot is an exact replica of the file retrieved from the destination folder and the original file snapshot is stored in the database as a binary large object ("BLOB").

12. The method of claim 1, further comprising, in response to determining the first file is unique, updating, by the computer-based system, the database with an event code associated with status of the first file.

13. The method of claim 1, further comprising determining, by the computer-based system, the first file is a duplicate in response to the first file hash being equal to the second file hash and updating the database with an event code indicating that the first file is a duplicate.

14. The method of claim 13, further comprising, in response to determining the first file is a duplicate, generating, by the computer-based system, an email notification to notify the entity that the first file is a duplicate.

15. The method of claim 1, further comprising validating, by the computer-based system, that a file size of the first file is greater than zero.

16. The method of claim 1, further comprising, in response to a trigger received from a scheduler, reading, by the computer-based system, the database to determine configuration information.

17. The method of claim 16, wherein the polling comprises polling a source folder based upon the configuration information; and moving a first file from the source folder to the destination folder.

18. The method of claim 17, further comprising, in response to an update of the configuration information, determining, by the computer-based system, new configuration information and polling, by the computer-based system, the source folder based upon the new configuration information.

19. The method of claim 11, wherein the calculating the first file hash uses at least one of a secure hashing algorithm (SHA) from the SHA-2 family.

20. The method of claim 1, wherein the retrieving a second file hash comprises retrieving a plurality of hashes from the database wherein each hash in the plurality of hashes is associated with the first file entity identifier, and wherein the determining the first file is unique comprises determining the first file is unique in response to the first file hash being unequal to each hash in the plurality of hashes.

21. The method of claim 1, further comprising updating, by the computer-based system, a file tracking table with an event code of the first file and inserting a record in an audit table wherein the record comprises the event code and a previous event code.

22. The method of claim 19, further comprising monitoring, by the computer-based system, each step that the file listener computer performs and logging an error in response to determining that an error has occurred.

23. The method of claim 1, further comprising validating, by the computer-based system, the first file based upon predetermined business rules.

24. An article of manufacture including a non-transitory, tangible computer readable storage medium having instructions stored thereon that, in response to execution by a computer-based system capable of processing files, cause the computer-based system to be capable of performing operations comprising:

polling, by the computer-based system, a source directory at periodic intervals for new files;

determining, by the computer-based system, that a first file is a new file;

calculating, by the computer-based system, a first file hash based upon the first file;

retrieving, by the computer-based system, a second file hash associated with a second file from a database, wherein a second file entity identifier from the second file and a file entity identifier from the first file are associated with a same entity;

determining, by the computer-based system, that the first file is an expected file type for the same entity;

determining, by the computer-based system, the first file is unique in response to the first file hash being unequal to the second file hash;

examining, by the computer-based system, the first file to determine first file attributes;

inserting, by the computer-based system, the first file attributes into the database; and parsing, by the computer-based system, the first file into payment file data.

25. A system comprising:

a processor capable of processing files, a tangible, non-transitory memory configured to communicate with the processor, the tangible, non-transitory memory having instructions stored thereon that, in response to execution by the processor, cause the processor to be capable of performing operations comprising:

polling, by the processor, a source directory at periodic intervals for new files;

determining, by the processor, that a first file is a new file;

calculating, by the processor, a first file hash based upon a first file;

retrieving, by the processor, a second file hash associated with a second file from a database, wherein a second file entity identifier from the second file and a file entity identifier from the first file are associated with a same entity;

determining, by the processor, that the first file is an expected file type for the same entity;

determining, by the processor, the first file is unique in response to the first file hash being unequal to the second file hash;

examining, by the processor, the first file to determine first file attributes;

inserting, by the processor, the first file attributes into the database; and parsing, by the processor, the first file into payment file data.

26. The system of claim 25, wherein the instructions are stored in a java application.

27. The system of claim 26, further comprising a plurality of java beans for storing data retrieved from the database.

* * * * *